United States Patent
Clinton

(12) 
(10) Patent No.: US 6,366,943 B1
(45) Date of Patent: Apr. 2, 2002

(54) ADDER CIRCUIT WITH THE ABILITY TO DETECT ZERO WHEN ROUNDING

(76) Inventor: Brian Martin Clinton, Silicon Systems Limited, 32034 Harcourt Street, Dublin 2 (IE)

(*) Notice: Subject to any disclaimer, the term of this patent is extended or adjusted under 35 U.S.C. 154(b) by 0 days.

(21) Appl. No.: 09/282,401

(22) Filed: Mar. 31, 1999

(51) Int. Cl.$^7$ ................................................ G06F 7/50
(52) U.S. Cl. ..................................................... 708/551
(58) Field of Search ............................... 708/551, 497

(56) References Cited

U.S. PATENT DOCUMENTS

| | | | |
|---|---|---|---|
| 4,994,996 A | | 2/1991 | Fossum et al. |
| 5,204,832 A | * | 4/1993 | Nakakura ................... 708/551 |
| 5,265,043 A | | 11/1993 | Naini et al. |
| 5,511,016 A | * | 4/1996 | Bechade ..................... 708/497 |
| 5,696,711 A | * | 12/1997 | Makineni .................... 708/497 |
| 6,055,555 A | * | 4/2000 | Boswell et al. ............. 708/551 |
| 6,148,314 A | * | 11/2000 | Matheny et al. ............ 708/497 |

OTHER PUBLICATIONS

Rothermel, Albrecht, et al., "Realization of Transmission-Gate Conditional–Sum (TGCS) Adders with Low Latency Time", Jun. 1989, pp 558–561, I.E.E.E. Journal of Solid State Circuits, vol. 24, No. 3.

Cortadella, Jordi, et al, "Evaluation of A+B=K Conditions Without Carry Propagation", Nov. 1992, pp. 1484–1485, I.E.E.E. Transactions on Computers, vol. 41, No. 11.

* cited by examiner

*Primary Examiner*—David H. Malzahn
(74) *Attorney, Agent, or Firm*—Richard K. Robinson

(57) ABSTRACT

An adder circuit uses a summing circuit to provide a summed sliced bit number from a first sliced bit number and a second sliced bit number. A boundary circuit is operably connected to the summing circuit to form a rounding boundary between selected groups of the summed sliced bit number. A rounding circuit is operably connected to the boundary circuit to detect a zero in each slice of the summed sliced bit number while the first and second sliced bit numbers are being added to one another. The rounding circuit includes a logic circuit to detect the zero and provide a zero detect output and a control circuit to selectively round the summed sliced bit number up and down in response to the zero detect output.

15 Claims, 14 Drawing Sheets

| zl | Sum k | zk | ZMk | ZMk+l |
|---|---|---|---|---|
| z22 | Sum23 | z23 | ZM23 | ZM24 |
| 0 | 0 | 0 | 1 | z24 |
| 0 | 0 | 1 | 1 | z24 |
| 0 | 1 | 0 | 0 | z24 |
| 0 | 1 | 1 | 1 | z24 |
| 1 | 0 | 0 | 1 | z24 |
| 1 | 0 | 1 | 1 | z24 |
| 1 | 1 | 0 | 1 | z2488 Sum 24 |
| 1 | 1 | 1 | 1 | z24 |

Fig. 3A

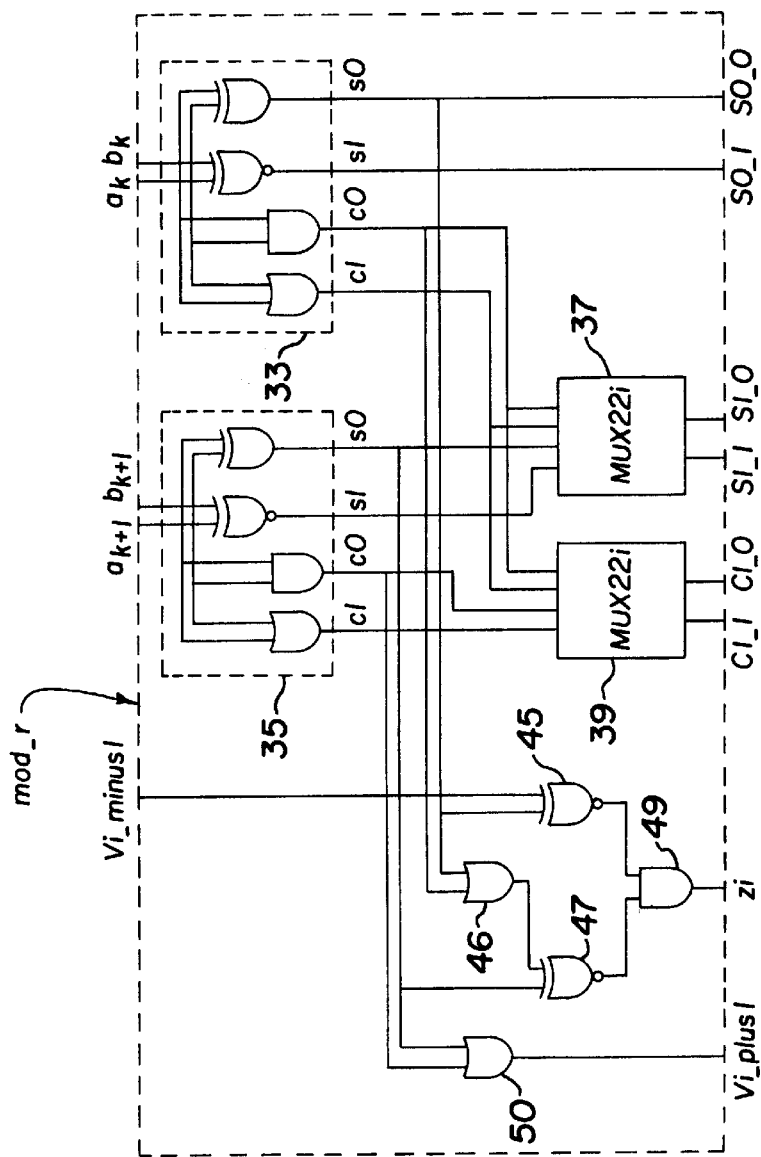
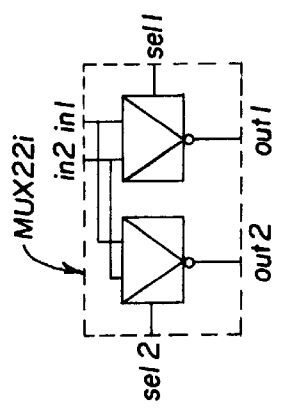
Fig. 5
Fig. 5A

ADDER CIRCUIT WITH THE ABILITY TO DETECT ZERO WHEN ROUNDING

BACKGROUND OF THE INVENTION

1. Technical Field of the Invention

This invention relates to digital processing for quick signal processing in an adder circuit while the adder circuit is rounding, and more particularly, the present invention is a circuit for detecting zero in an adder system and using this to provide convergent rounding.

2. Description of Related Art

A Multiply and Accumulator (MAC) device contains the logic structures required to perform arithmetic operations on data. A MAC may comprise a fractional multiplier, an arithmetic logic unit (ALU), a shifter, and accumulators. An ALU is typically comprised of at least a Booth decoder for converting the ALU inputs into parallel bytes for internal processing, a Wallace tree for controlling multiplexing and shifting, and an Adder.

On the bit level, a simple adder is an organization of logic circuits, typically comprising one Exclusive OR (XOR) gate and one AND gate. The simple adder (adder) numerically adds two binary bits together to produce a two-bit binary output which is typically divided into a sum bit and a carry bit. When adding more than two one-bit numbers, additional logic structures are necessary.

Because the basic logic gate of a single adder stage is a two-input XOR gate, the most basic adding device, the adder, adds only two bits at a time. In order to add larger numbers together, several single adder stages must be placed in parallel and the logic must be enhanced to account for carry bits. Likewise, before reporting the results of an adding operation, the adder must first account for all of the values carried from less significant bits all the way through the adder. This add and carry, add and carry, add and carry process takes considerable time (called a propagation delay). Many attempts have been made to speed up the add operation.

In *Realization of Transmission-Gate Conditional-Sum (TGCS) Adders with Low Latency Time* by Rothermel, et. al, the authors advocate using TGCS adders because of the adders' short propagation delay and similarities to complementary metal oxide semiconductor (CMOS) circuits. *Realization of Transmission-Gate Conditional-Sum (TGCS) Adders with Low Latency Time,* T. Rothermel, et. al, IEEE Journal of Solid State Circuits, Vol. 24, No. 3, June 1989, p. 558.

In *Evaluation of A+B=K Conditions Without Carry Propagation,* Cortadella and Liaberia propose a method and design for evaluating A+B=K conditions without using carry propagation. *Evaluation of A+B=K Conditions Without Carry Propagation,* J. Cortadella and J. Liaberia, IEEE Transactions on Computers, Vol. 41, No. 11, November 1992 p. 1484. This is the method of circuit design commonly used today to compare the result of an add operation to a predetermined number.

In the situation where an adder must perform a rounding operation, the time delay can become very significant. This is caused when rounding operations require logic zeros be detected for some of the simple adders that make up the adder block of the ALU. Thus, a check must be made for the presence of zeros after the completion of an add operation. This operation is usually performed by an AND operation which provides additional time delays to the ALU operations. Since the zero detection must be performed for each cycle of the ALU, the time delays are cumulative.

Therefore, it is advantageous to have an adder circuit for detecting zeros in order to accelerate the time required for the rounding operation.

SUMMARY OF THE INVENTION

In accordance with the present invention, there is provided an adder circuit that comprises a summing circuit to provide a summed sliced bit number from a first sliced bit number and a second sliced bit number. A boundary circuit is operably connected to the summing circuit to form a rounding boundary between selected groups of the summed sliced bit number. A rounding circuit is operably connected to the boundary circuit to detect a zero in each slice of the summed sliced bit number while the first and second sliced bit numbers are being added to one another. The rounding circuit includes a logic circuit to detect the zero and provide a zero detect output and a control circuit to selectively round the summed sliced bit number up and down in response to the zero detect output.

Further, in accordance with the present invention, there is provided a method of improving the speed of an adder. The method comprises the steps of slicing first and second bit numbers into first and second sliced bit numbers. A rounding boundary is formed between selected groups of the first and second sliced bit numbers. The first and second sliced bit numbers are added to form a summed sliced bit number. A zero is detected at each slice of the summed slice bit number. A zero detect output is provided in response to each detected zero. Each summed sliced bit number is then selectively rounded up and down in response to the zero detect output.

Further, in accordance with the present invention, there is provided a multiply and accumulator circuit. The multiply accumulate circuit comprises first and second registers to store a first operand A and a second operand B. A decoder is operably connected to said first and second registers to create a partial product from each of the first and second operands A and B. A partial product summation tree circuit is operably connected to the decoder circuit to create a first bit number A and a second bit number B and to partially add bit numbers A and B to one another. An adder circuit for adding bit numbers A and B to one another to produce a summed bit number C is operably connected to the partial product summation tree. The adder circuit includes a summing circuit to provide a summed sliced bit number from a first sliced bit number and a second sliced bit number. A boundary circuit is operably connected to the summing circuit to form a rounding boundary between selected groups of the summed sliced bit number. A rounding circuit is operably connected to the boundary circuit to detect a zero in each slice of the summed sliced bit number while the first and second sliced bit numbers are being added to one another. The rounding circuit includes a logic circuit to detect the zero and provide a zero detect output and a control circuit selectively rounds the summed sliced bit number up and down in response to the zero detect output.

BRIEF DESCRIPTION OF THE FIGURES

FIG. 3A is a logic array showing preferred operation of the rounding circuit shown in FIGS. 2 and 3;

FIG. 5 is a schematic diagram of a component of the adder shown in FIGS. 4, 4A, 4B, 4C and 4D;

FIG. 5A is a schematic diagram of a component of the adder shown in FIGS. 4, 4A, 4B, 4C and 4D;

DETAILED DESCRIPTION OF EMBODIMENTS

The present invention provides an adder circuit having a zero detecting reworking circuit. By providing the ability to detect zero when rounding, the present invention gives adder circuits the ability to realize the time savings afforded by ignoring the add operations and proceed directly to the next operation when the combination of the two operands is equal to zero.

Figure 1:
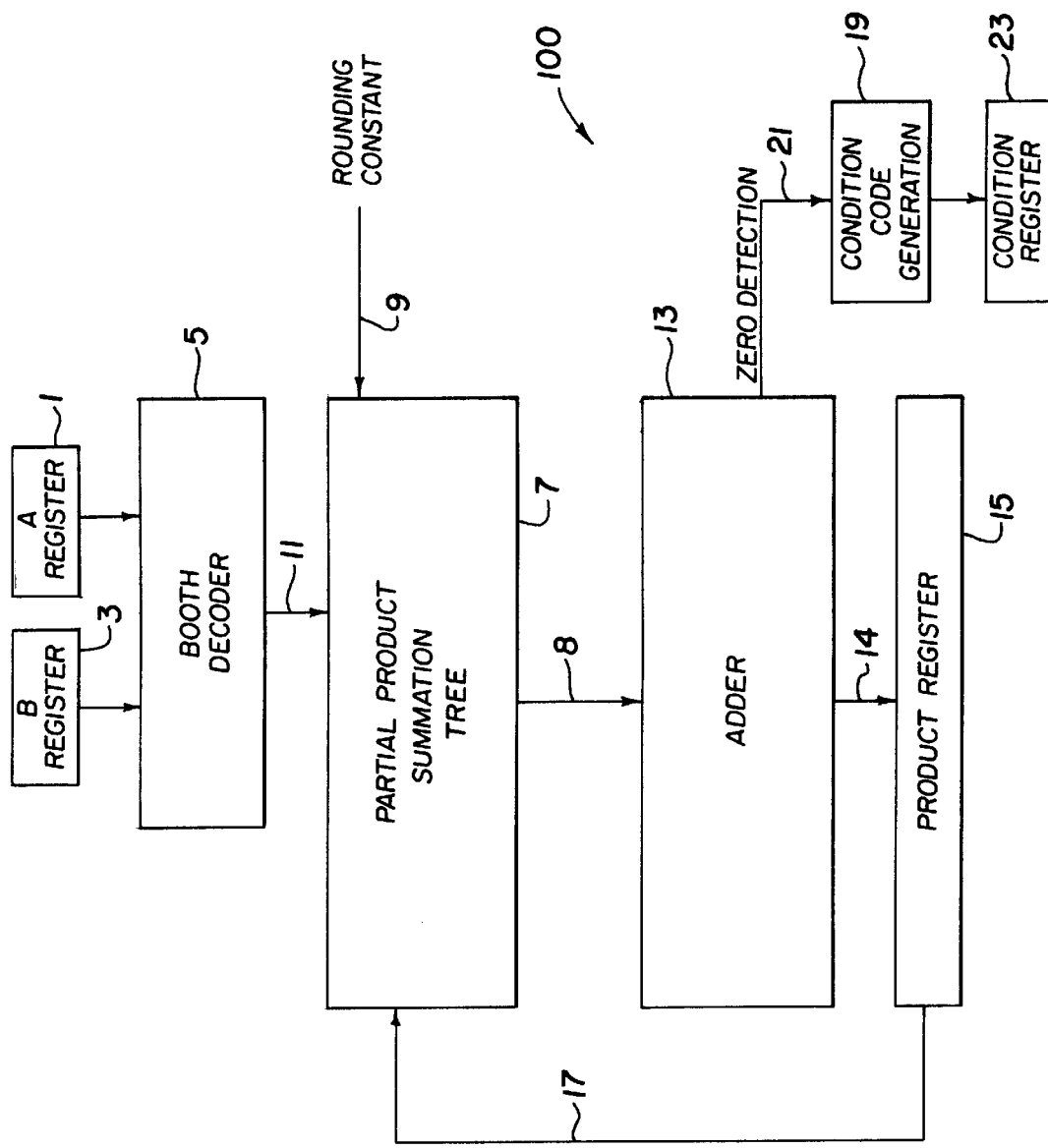
FIG. 1 is a block diagram of a multiply and accumulator device constructed according to the present invention.

Turning now to FIG. 1, there is shown a block diagram of a multiply and accumulator unit (MAC) 100 constructed according to the invention. The multiply and accumulator circuit 100 includes a register 1 where an operand A is stored prior to being applied to the Booth decoder 5 and a register 3 where a operand B is stored prior to being applied to the Booth decoder 5. It is preferred that register 1 and register 3 operate on 56 bits and operand A and operand B consist of 56 bits.

The Booth decoder 5 receives operand A from register 1 and operand B is received from register 3, and manipulates them to produce a partial product. The partial product is applied to the partial product summation tree 7, preferably a Wallace tree, via bus 11. The partial product summation tree 7 also receives inputs from a product register 15 via bus 17 and a rounding constant (RND) via bus 9. The Wallace tree 7 performs partial product summation based upon the status of these received inputs.

An adder 13 for adding the operands A and B to one another receives an output 8 from partial product summation tree 7. The partial sums are then passed to a product register 15 via bus 14. A zero detection output is carried via bus 21 to a condition code generation logic 19. The condition code generated by condition code logic 19 is stored in a condition code register 23, which is controlled by a condition code generator (not shown).

Figure 2:
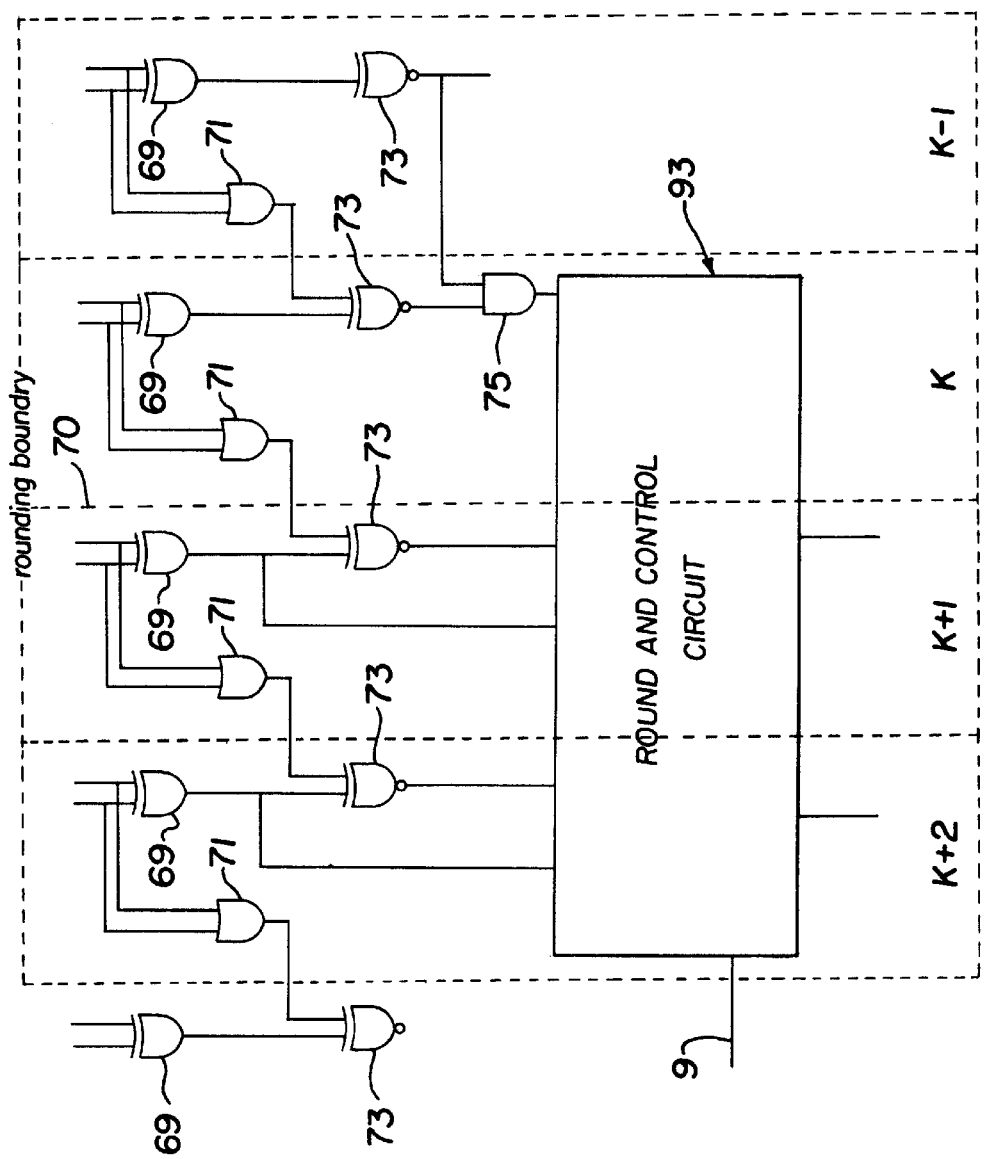
FIG. 2 is a diagram of a rounding circuit embodied in the invention shown in FIG. 1.

Turning now to FIG. 2, there is shown a diagram of adder 13 that explains the non-recursive zero detection method of convergent rounding being utilized in this invention. Four bit slices K−1, K, K+1 and K+2 are illustrated with each bit slice being an adder stage including an exclusive OR (XOR) gate 69, an OR gate 71, and an exclusive NOR (XNOR) gate 73. Each XNOR gate 73 performs an exclusive NOR of the output of XOR gate 69 to form the partial sum for that adder stage and the carry-in signal from the previous bit slice. The carry-in signal is provided by each gate 71 that ORs the bits associated with the respective bit slice.

As shown in FIG. 2, the rounding boundary 70 is between bit slice K and K+1. The rounding boundary selection site is based on the location in the number representing the point at which rounding is to occur. The rounding bit is the bit to the right of the rounding boundary, which is represented by K in FIG. 2.

When using convergent rounding, an analysis is made after standard rounding has occurred to determine if all bits to the right of the rounding boundary are zero. If all of these bits are zero, the convergent rounding method results in bit K+1 being rounded up when the bit is a logic one and being rounded down when the bit is logic zero.

In bit slice K of FIG. 2, AND gate 75 ANDS zero detects from all previous stages with the output of XNOR gate 73 of the K bit slice to obtain the zero detect for bit slice K, the boundary zero detect. For boundary 70, there is only one previous stage zero detect, $Z_{K-1}$, so AND gate 75 is only required to be a two-input AND gate. The zero detect output of AND gate 75 is applied to the round and control circuit at terminal $Z_K$. The output of gate 75 will be a one when the sum for bit slice K is zero with both bits of bit slice K−1 and VK−1 being zero and it will be one when the sum for bit slice K is one with both bits of bit slice K−1 being one and VK−1 being zero. Otherwise, it will be zero.

As shown in FIG. 3A, the output of the XNOR gate 73 provides the zero detect indication for that bit slice. The output of XNOR 73 will be a logic one when the sum for that bit slice is zero with both bits of the previous bit slice being zero or it will be one when the sum for that bit slice is one with at least one bit from the previous bit slice also being one. The sum for a bit slice will be zero when both bits or zero are both bits are one. Otherwise, the sum will be one.

As shown, there is also a sum and a zero detect output for bit slices K−1, K+1, and K+2. However, the bit slices that are not to the immediate right of the rounding boundary 70 do not require an AND gate 75.

The zero detect outputs for these slices are shown as $Z_{K-1}$, $Z_K$, $Z_{K+1}$ and $Z_{K+2}$, respectively.

The two most significant bits next to the rounding bit, the ones to the left of the boundary in FIG. 2, are affected by the convergent rounding operation. Therefore, both the sum and the zero detect bits of bit slice K+1 and K+2 are applied to the round and control logic 93 at the $\text{Sum}_{K+1}$, $Z_{K+1}$, $\text{Sum}_{K+2}$, and $Z_{K+1}$ signals, respectively.

Figure 3:
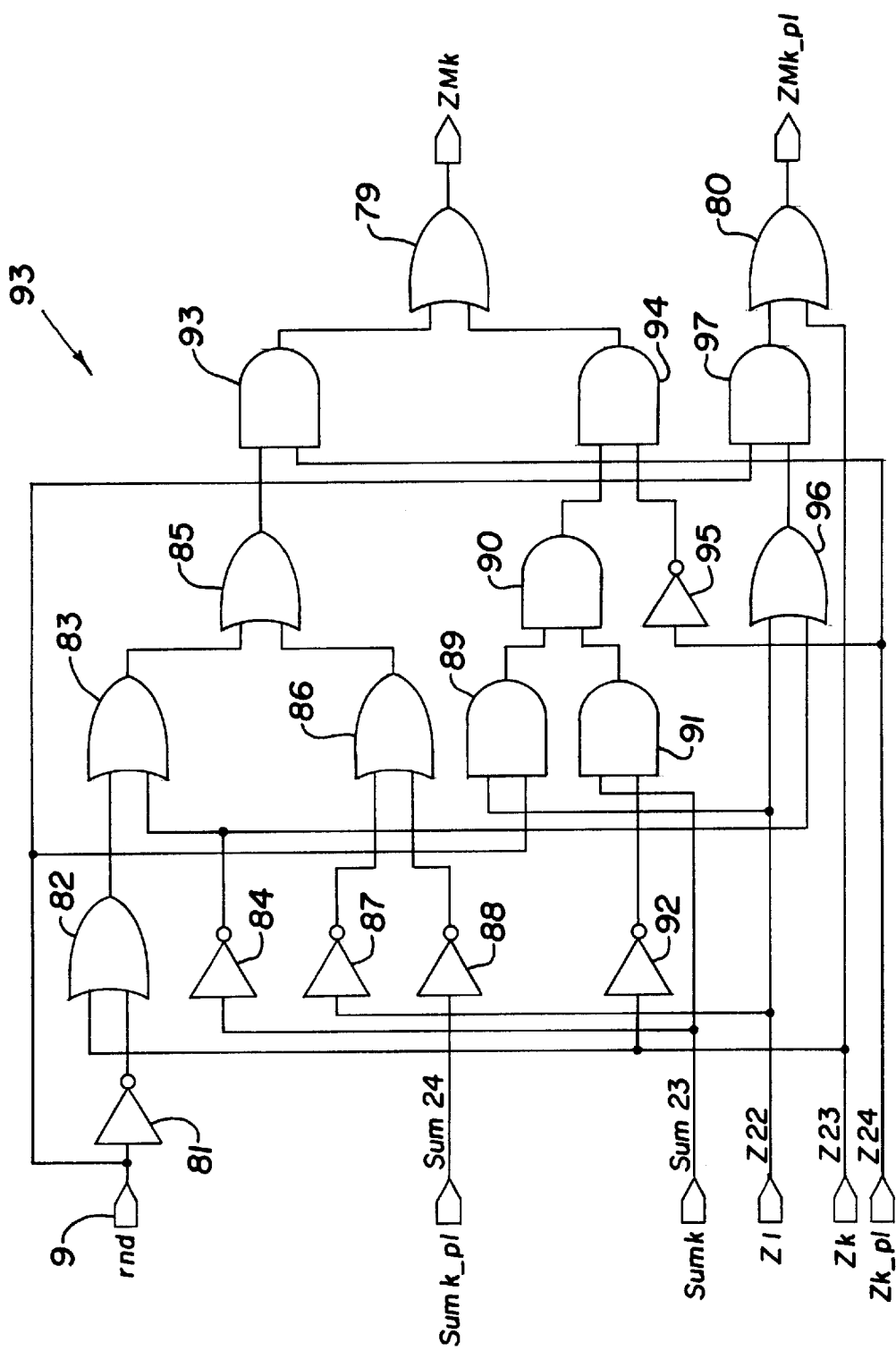
FIG. 3 is a schematic diagram of a round and control circuit embodied in the invention shown in FIG. 2.

In FIG. 3, there is shown a schematic diagram of the round and control circuit 93 employed in the circuit shown in FIG. 2. Inputted into circuit 93 in FIG. 3 from the circuit shown in FIG. 2 are the following: signal rnd from signal 9; signal $\text{Sum}_{k\_p1}$ from signal $\text{Sum}_{24}$; signal $\text{Sum}_k$ from signal $\text{Sum}_{23}$; signal $Z_1$ from signal $Z_{22}$; signal $Z_k$ from signal $Z_{23}$; and signal $Z_{k\_p1}$ from signal $Z_{24}$. Outputted from circuit 93 shown in FIG. 3 into the circuit shown in FIG. 2 are the following: signal $ZM_k$ into signal $ZM_{23}$ and output signal $ZM_{k\_p1}$ into signal $ZM_{24}$.

Signal $ZM_k$ is outputted from OR gate 79 and output signal $ZM_{k\_p1}$ is outputted from OR gate 80. Signal rnd is passed through inverter 81 to one side of OR gate 82 with its other side receiving signal $Z_k$. The output from OR gate 82 is inputted to one side of OR gate 83 with its other side receiving inverted signal $\text{Sum}_k$, which is obtained by passing input signal $\text{Sum}_k$ through inverter 84. The output from OR gate 83 is inputted to one side of OR gate 85 with its other side receiving an output from an OR gate 86, which has signal $Z_1$ inverted by inverted 87 inputted to one side and input signal $\text{Sum}_{k\_p1}$ inverted by inverter 88 inputted to its other side. Input signal $Z_1$ is passed to one side of AND gate 89 and its other side receives signal rnd. The output signal from AND gate 89 is inputted in one side of AND gate 90 with its other side receiving a signal from AND gate 91, which is the result of input signal $Sum_k$ inputted in one side of AND gate 91 and its other side receiving an inverted signal $Z_k$ caused by signal $Z_k$ passing through inverter 92. The output from OR gate 85 is inputted to the first side of an AND gate 93 with its other side receiving input signal $Z_{k\_p1}$, and the resulting output is received in the first side of OR gate 79. The output from AND gate 90 is inputted to the first side of an AND gate 94 with its other side receiving an input signal $Z_{k\_p1}$, which has been inverted by inverter 95. One side of AND gate 97 receives signal rnd with its other side receiving the output from OR gate 96, which has one side receiving signal $Z_1$ and its other side receiving signal rnd. The output from AND gate 97 is received on one side of OR gate 80 and the other side of OR gate 80 receives signal $Z_k$.

As shown in FIG. 3A, circuit 93 produces logical truth outputs of 0 and 1.

The status of RND terminal 9 determines whether the adder is in the rounding state or not and is used to select the outputs 79 and 80. When rounding is not enabled, signal rnd will be logic zero and the carry-in signals at $Z_K$ and $Z_{K+1}$ will be passed through an outputs $ZM_K$ and $ZM_{K\_P1}$, respectively. When rounding is enabled, these two outputs are modified to accomplish the round up and round down feature for convergent rounding. The $ZM_K$ and $ZM_{K\_P1}$ outputs of the round and control circuit are shown in FIG. 2 as $ZM_{22}$ and $ZM_{24}$.

As shown in FIGS. 1 and 2, when rounding is enabled as indicated by a logic 1 on conductor 9, $ZM_K$ is equal to the output of AND/OR 79 and $ZM_{K+1}$ is equal to the output of OR 83. When rounding is enabled with $Z_{k+2}$ being zero, $ZM_K$ will be equal to $Z_K$ and $ZM_{K+1}$ will be equal to $Z_{k+1}$ or the inverse of $Sum_{K+1}$. When rounding is enabled with $Z_{k+2}$ being one, $ZM_K$ will be equal to one when both $Z_{K+1}$ and $Sum_{K+1}$ are ones and $ZM_{K+1}$ will be equal to the inverse of $Sum_{K+1}$. Therefore when $Z_{k+2}$ is one, $ZM_K$ will always equal zero when $ZM_{K+1}$ is one; $ZM_{K+1}$ will always equal zero when $ZM_K$ is one; and $ZM_K$ will equal one when $ZM_{K+1}$ is zero with $Sum_{K+1}$ being one. This accomplishes the convergent rounding.

The $ZM_K$ and $ZM_{K+1}$ outputs the condition code interface to the condition code register 19 of FIG. 1. Thus, the round and control circuit of FIG. 3 is equivalent to the condition code generation block 19 of FIG. 1. The zero detection bus 21 of FIG. 1 is equivalent to the Z and Sum interfaces in FIG. 3.

Figure 4:
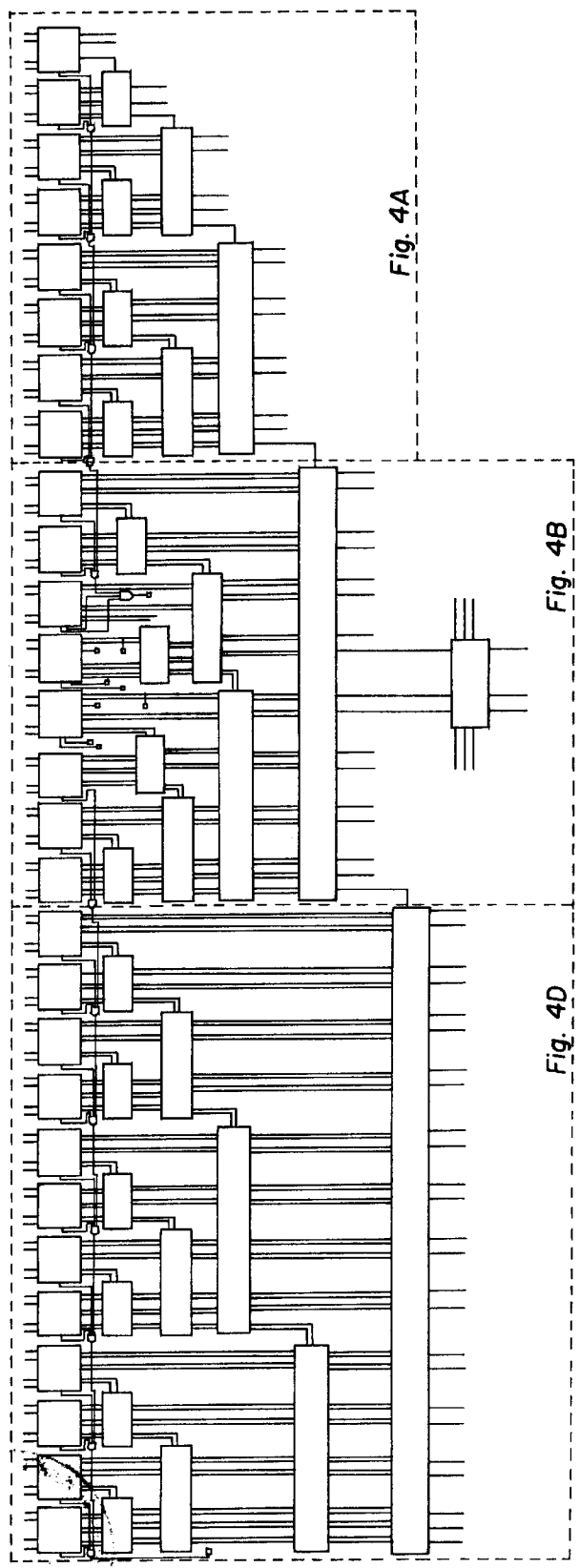
FIG. 4 is a schematic diagram of a 56-bit adder embodied in the invention shown in FIG. 1.
Figure 4A:
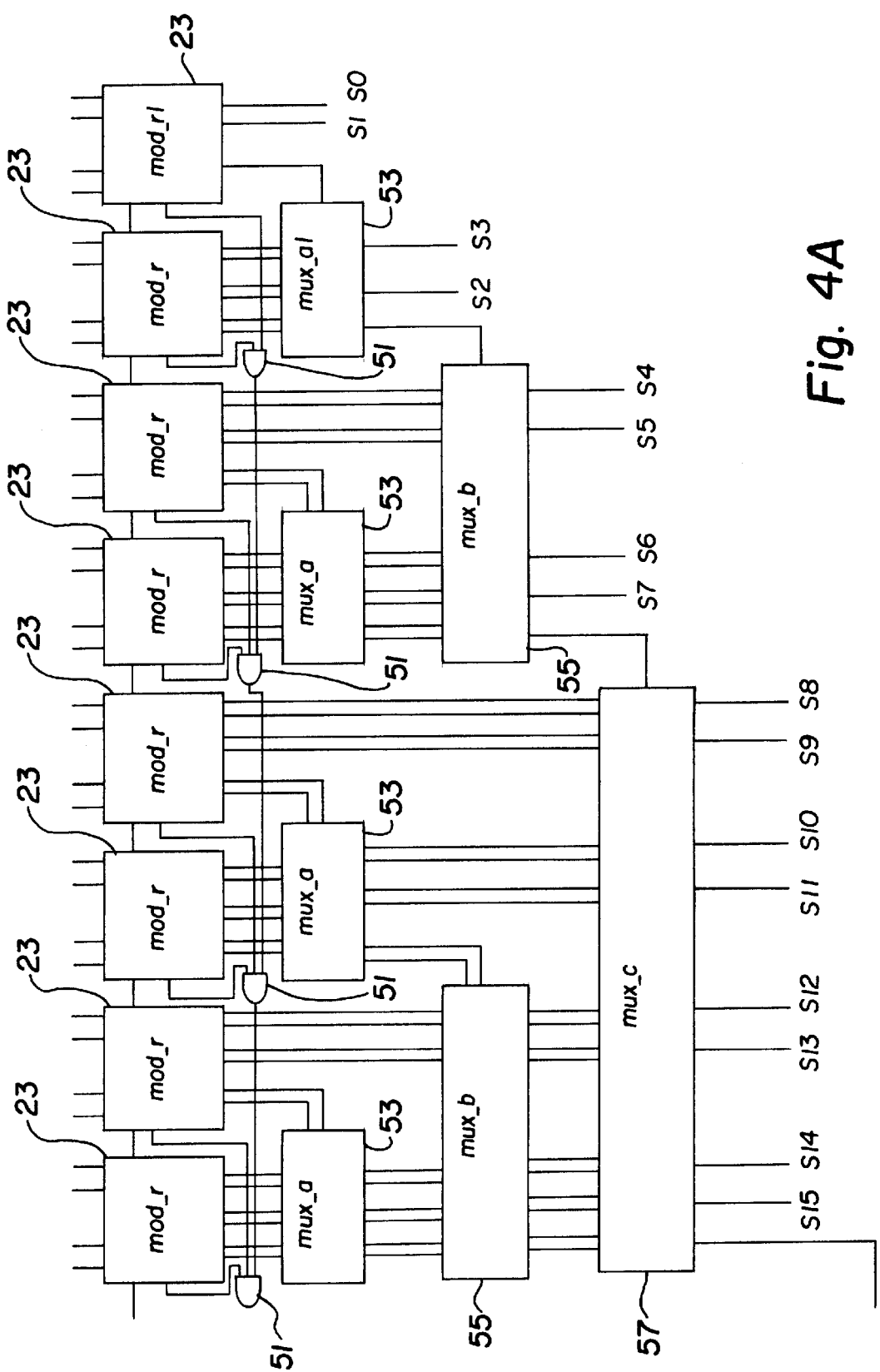
FIGS. 4A, 4B, 4C and 4D are enlarged schematic diagrams of portions of the 56-bit adder shown in FIG. 4.
Figure 4B:
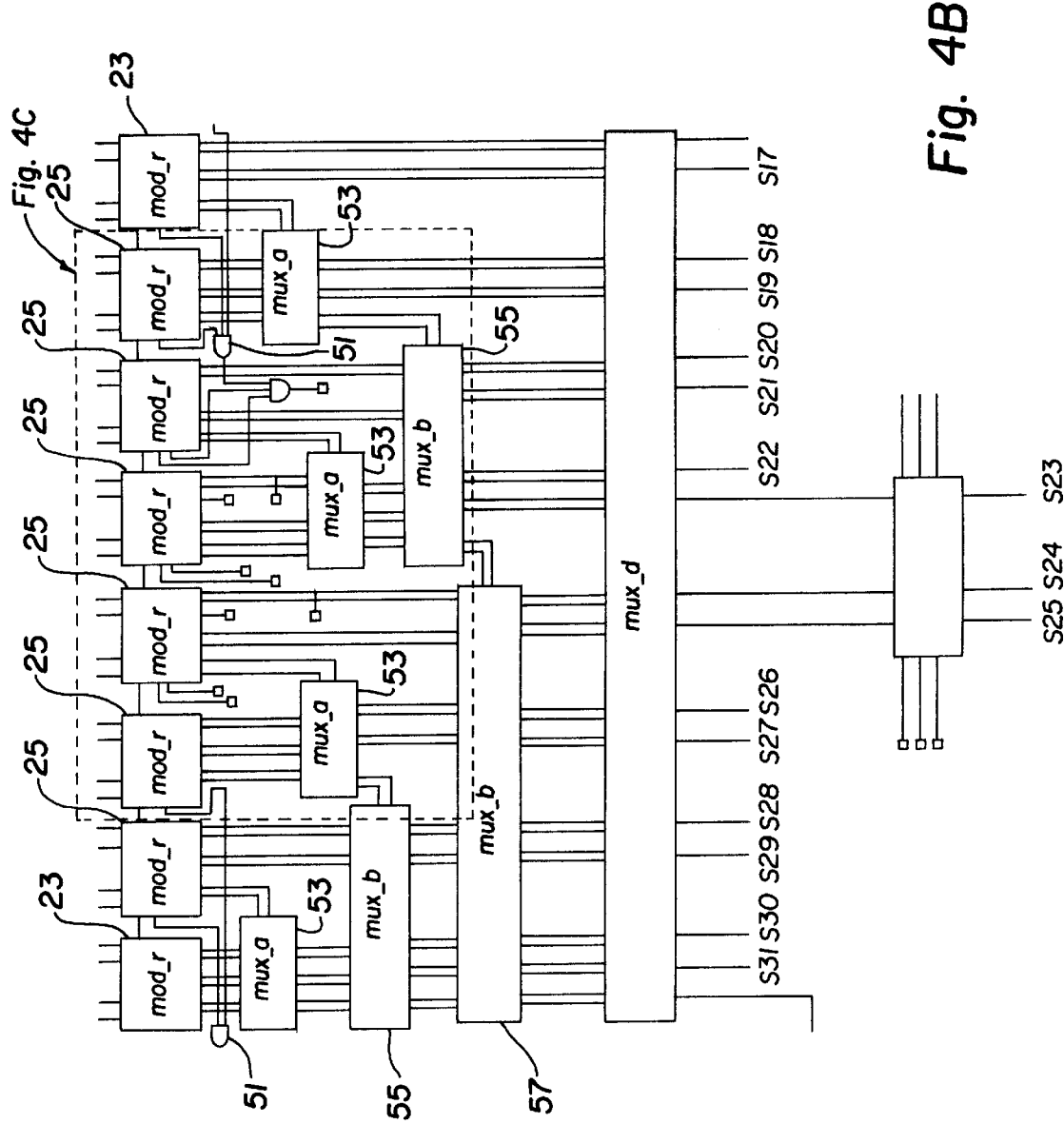
Figure 4C:
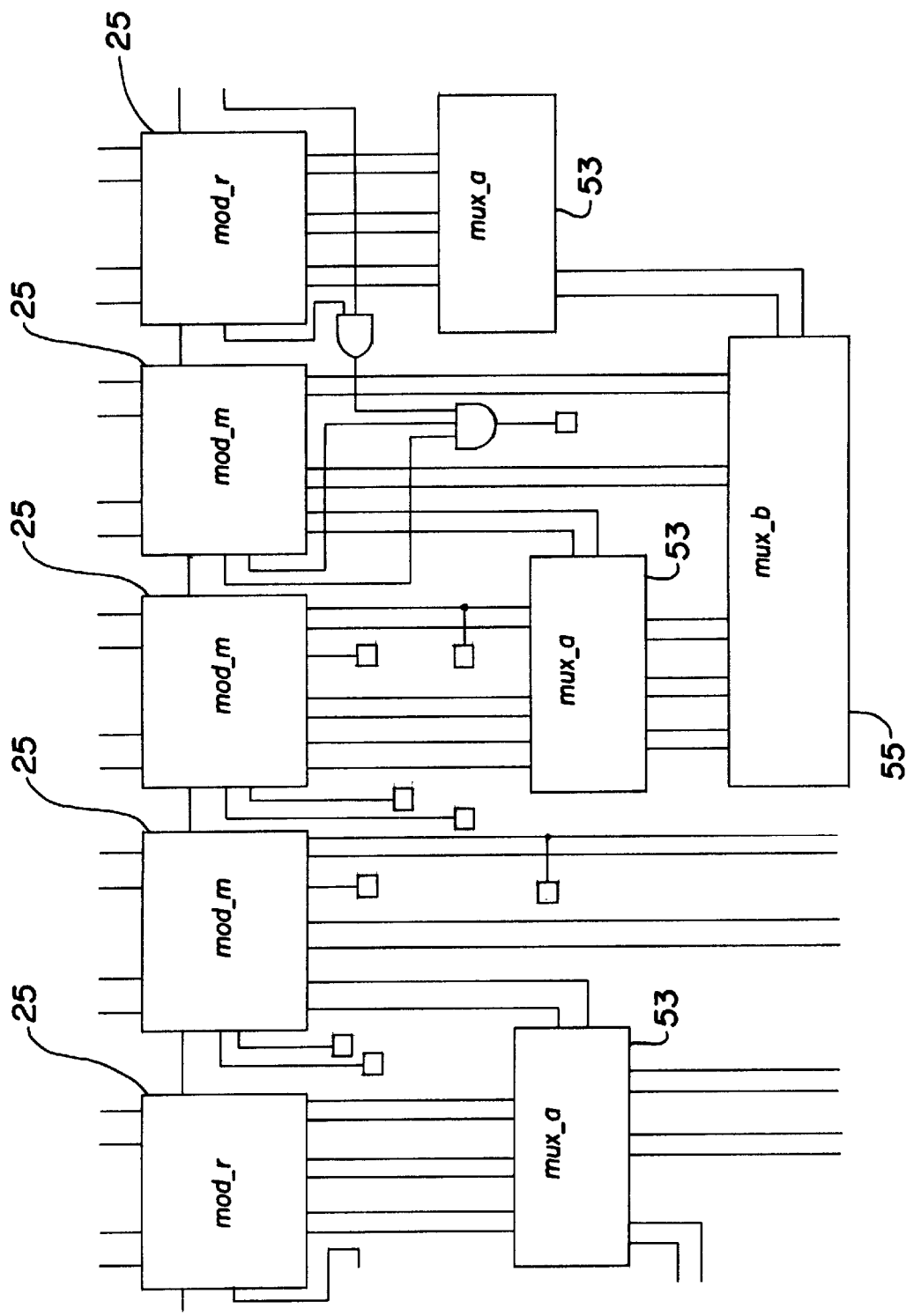
Figure 4D:
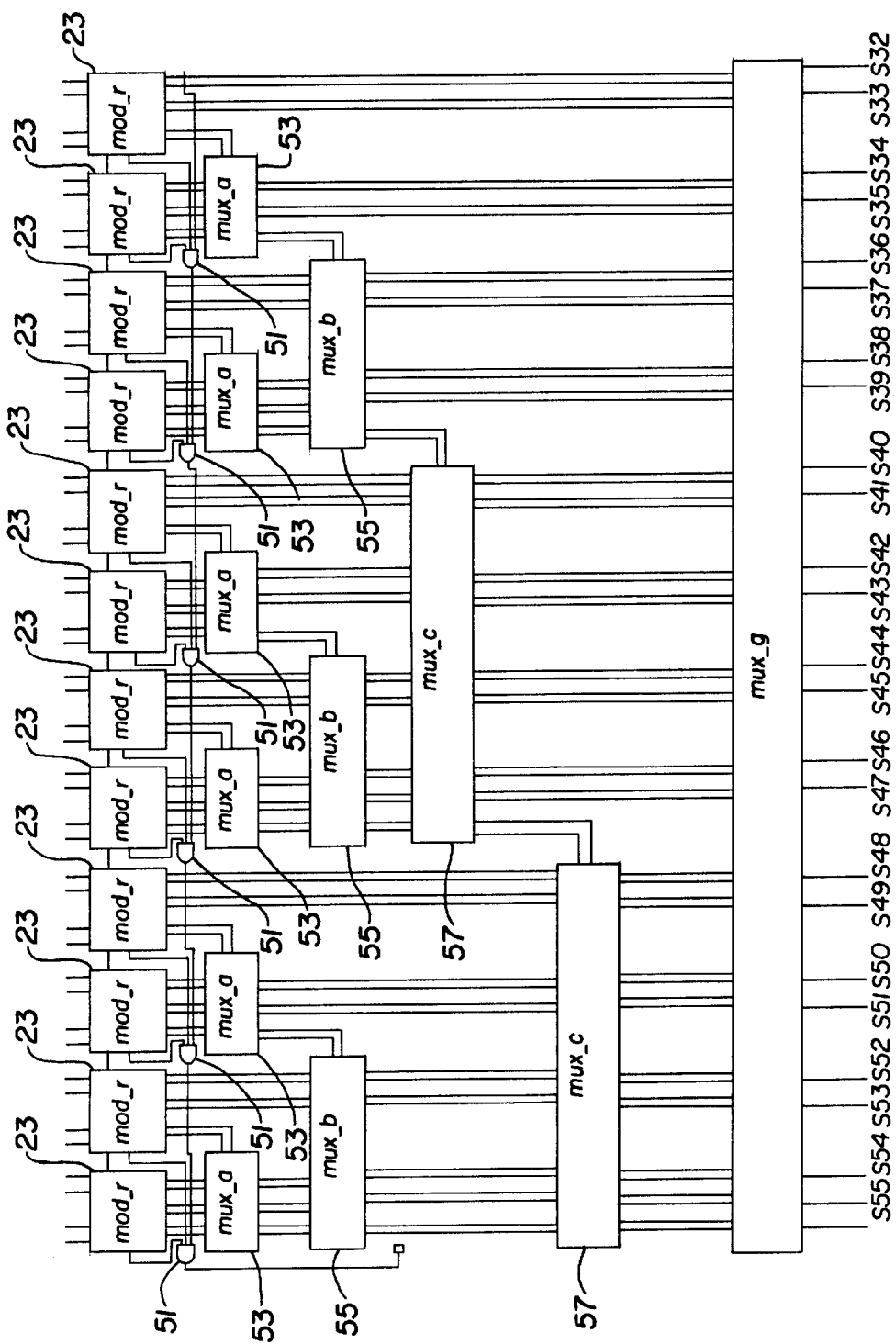

As best seen in FIGS. 4 through 4D, it is preferred that a 56-bit adder 13 be used. The Adder is divided into three segments comprising the least significant bit (LSB) stage, the boundary stage, and the most significant bit (MSB) stage. As best seen in FIGS. 4 and 4A, the LSB stage is composed of ten adder circuits 23 that make up the LSB adder stages covering bits 0 through 19. As best seen in FIGS. 4, 4B and 4C, the boundary stage comprises six boundary adder circuits 25 covering bits 20 through 25. As best seen in FIGS. 4 and 4D, the MSB stage covers bits 26 through 55 with fifteen adder circuits 23 being in the MSB stage.

Figure 8:
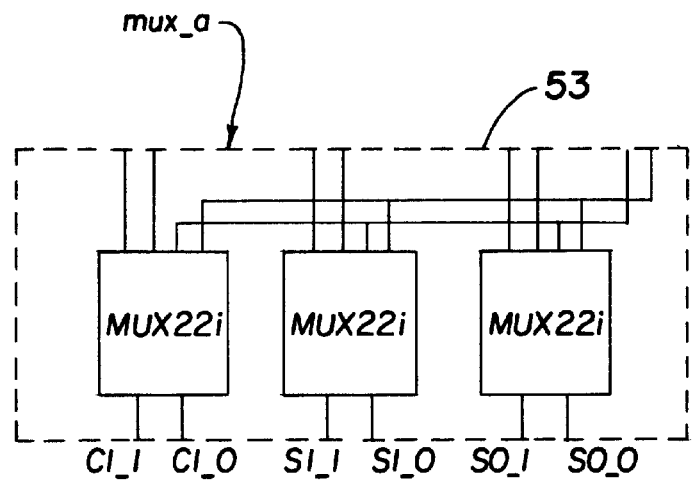
FIG. 8 is a schematic diagram of a component of the adder shown in FIGS. 4, 4A, 4B, 4C and 4D.
Figure 9:
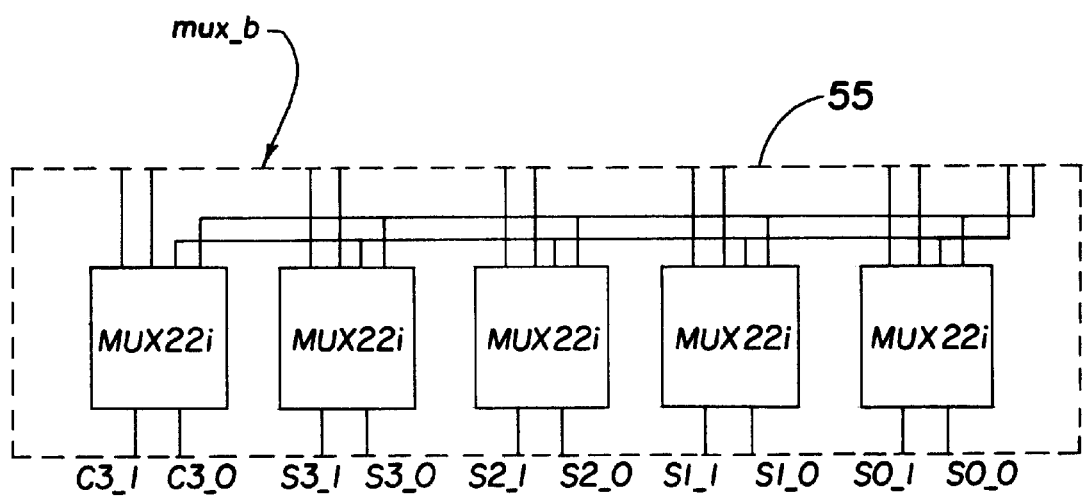
FIG. 9 is a schematic diagram of a component of the adder shown in FIGS. 4, 4A, 4B, 4C and 4D.
Figure 10:
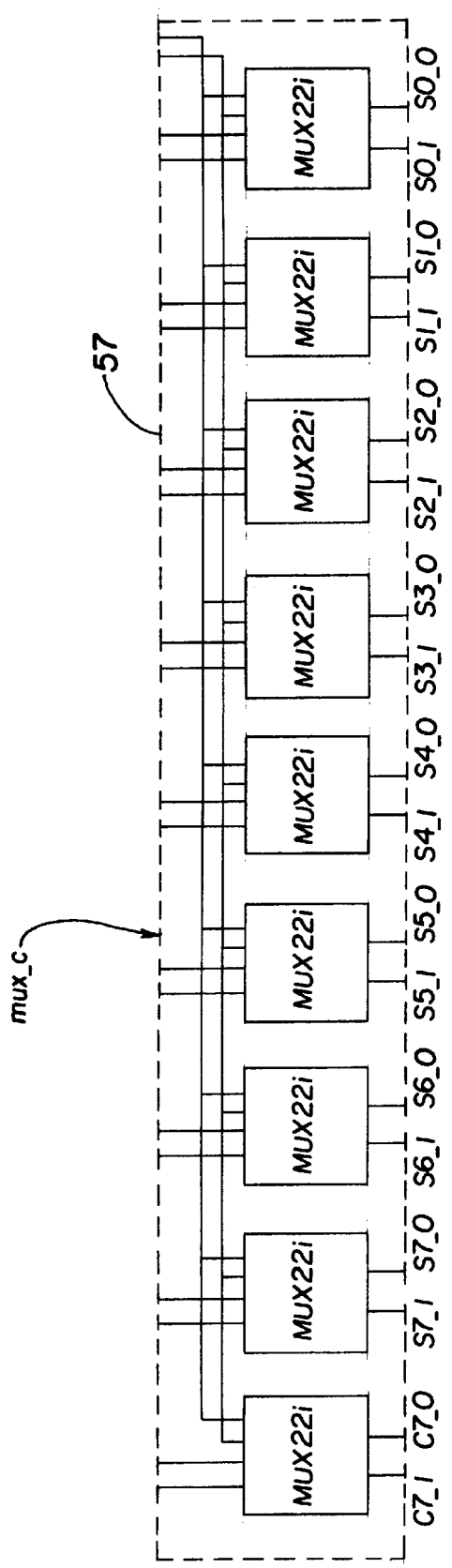
FIG. 10 is a schematic diagram of a component of the adder shown in FIGS. 4, 4A, 4B, 4C and 4D.

The adder circuits of each stage interface with logic associated with the preceding and following bits as well as AND gates 51 and multiplexers 53, 55 and 57. These form a conditional sum adder including a tree that is a combination of the AND gates 51 and multiplexers 53. Although the logic is similar to conditional sum adders known in the prior art, the zero detect of the present invention is different. The AND gates 51 associated with the LSB and boundary bits are connected to AND gate 55 to perform the AND function for zero detects as explained in connection with the circuit shown in FIG. 2, multiplexer 53 is shown in FIG. 8, and multiplexer 55 is shown in FIG. 9 and multiplexer 57 is shown in FIG. 10.

As best seen in FIGS. 4B and 4C, the boundary stages are used to perform the convergent rounding so that the speed of the zero detection in the Adder 13 is enhanced. A boundary is selected from one of the boundary stage bits 22, 23 or 24 as determined by the rounding constant input 9 that is supplied to the partial product summation tree 7 shown in FIG. 1. Since three options exist for the boundary location, the rounding constant 9 consists of three signals representing an enabling signal for each of the possible boundary bits. Only one of the three boundary stages may be selected by the rounding constant at any given time.

Convergent rounding requires that once the boundary is selected that a check must be made to see if all of the LSBs, including the selected boundary bit, are zero. If any LSB is a logic one, no changes are made to the next most significant bit that is adjacent to the previous boundary bit. When the condition of all zeros is met with the significant bit next to the boundary bit being a logic one, this bit is rounded up and becomes a logic zero. If the all LSBs to the right of the boundary are zero and the next significant bit is a logic zero, this bit is rounded as indicated in the logic table shown in FIG. 3A.

FIGS. 5 and 5A provide a schematic diagram of adder circuit 23. It includes a first half adder 33 and a second half adder 35. Each adder is the type known in the art with the summation being performed on an A-bit that is part of the partial product and a B-bit, which is also part of the partial product from the partial product summation tree 7. Each adder has four outputs labeled S0, S1, C0, and C1. S0 is a logic one when the summation result of the data on the A-terminal and the B-terminal is a logic zero for the list significant bit (LSB). S1 is a logic one when the summation result is a logic one for the LSB. C0 is a logic one when the carry out or most significant bit (MSB) of the summation is a logic zero and C1 is a logic one when the carry out is a logic one. The first adders 33 provide for output signals denoted as S0, S1, C0 and C1. S0 and S1 leave the block as S0-1 and S0-0 and are applied to the AND gates 51 and multiplexers 53, as shown in FIGS. 4 through 4D. C0 and C1 are used to control the select lines for both the first mux 37 and second mux 39. First and second mux 37 and 39 are of conventional construction and are best seen in FIG. 5. In response to the select lines, the first mux 37 will multiplex the second adder outputs S0 and S1 to the two output lines, S1-0 and S1-1. Similarly, the C0 and C1 as outputs C1-1 and C1-0, respectively.

As shown in FIG. 5, Vi_minus1 representing the number of the bit slice and S0 from first adder 33 are inputted into an exclusive NOR (XNOR) gate 45. Inputted into a second exclusive NOR (XNOR) gate 47 are the results of the OR gate 46 receiving inputs S0 and C0 from first adder 33, and output S0 from second adder 35. The results from XNOR gates 45 and 47 are then inputted to OR gates 49 with the results being signal Zi. The output Vi_plus1 results from the signals S0 and C0 from second adder 25 being passed through OR gate 50.

As can be seen, each block 23 provides the add function of two A and B bits, and performs the zero detect for the two A and B bits associated with its location in the adder. Thus, blocks 23 associated with the LSB and MSB segments of the Adder 13 of FIGS. 4 through 4D provide the outputs that are applied to the AND gate and multiplexer tree of Adder 13.

Although there appears to be an inconsistency in the apparatus shown in FIG. 5 with the apparatus shown in FIG. 2 in that OR gate 71 in FIG. 2 and OR gates 46 and 50 in FIG. 5 should have the same function as relating to $a_k$ and $b_k$. In FIG. 5, the inputs to the OR gates 46 and 50, respectively, come from s0 and c0 while in FIG. 2, the inputs to OR gate 71 are directly to $a_k$ and $b_k$. Since outputs s0 and c0 from blocks 33 and 35 are inputted to OR gates 46 and 50, respectively, the equation at the output of OR gate 46 is ($a_k$ XOR $b_k$) OR ($a_k$ AND $b_k$), which can be reduced to $a_k$ OR $b_k$, and the equation at the output of OR gate 50 is ($a_{k+1}$ XOR $b_{k+1}$) OR ($a_{k+1}$ AND $b_{k+1}$), which can be reduced to $a_{k+1}$ OR $b_{k+1}$. Thus, the apparatus shown in FIG. 5 is consistent with the apparatus shown in FIG. 2.

In order to reduce the time taken to do the overall multiplication, this structure is implemented in the adder to reduce the capacitance load on the signals $a_k, a_{k+1}, \ldots a_N$ and $b_k, b_{k+1}, \ldots b_N$. The capacitance load due to the metal routing on the silicon of the signals $a_k, a_{k+1}, \ldots a_N$ and $b_k, b_{k+1}, \ldots b_N$ is large because they come from the summation (WALLACE) tree outputs. The summation tree is located in another physical part of the same silicon, a distance from the adder block. Reducing routing delay and any input capacitance associated with any gates, the capacitance load of the signals $a_k, a_{k+1}, \ldots a_N$ and $b_k, b_{k+1}, \ldots b_N$ are reduced by reducing the fan-in of these signals. In FIG. 2, the fan-in is reduced by not connecting $a_k, a_{k+1}, \ldots a_N$ and $b_k, b_{k+1}, \ldots b_N$ to the OR gates 50/46 directly.

Figure 6:
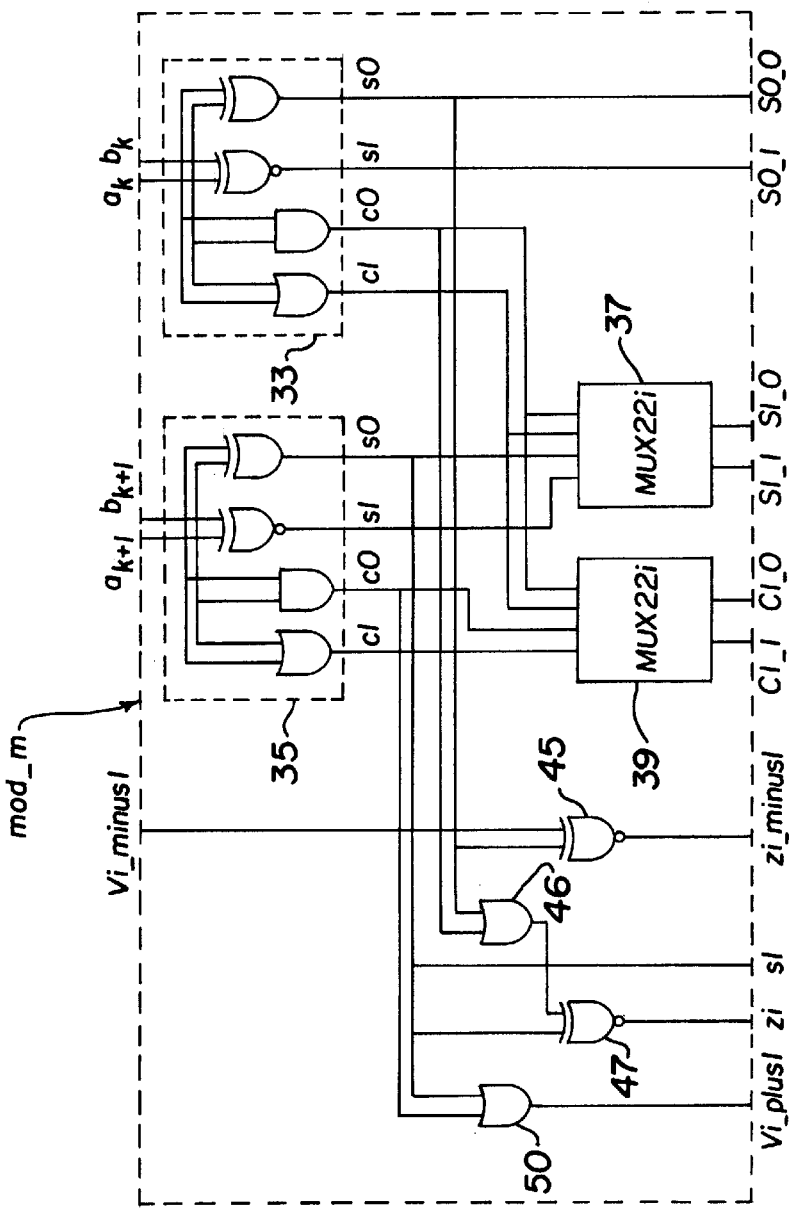
FIG. 6 is a schematic diagram of a component of the adder shown in FIGS. 4, 4A, 4B, 4C and 4D.

As shown in FIG. 6, the boundary adder embodies first adder 33, second adder 35, first mux 37 and second mux 39, which function in accordance with the previously described functions. The boundary adder also includes XNOR gates 45 and 47 and OR gates 46 and 50 to provide the output Vi_plus1 and Zi. Also, provided at outputs S1 from S0 from second adder 35 and Zi_minus1 as a result of Vi-minus1 and S0 from first adder 33 being inputted into XNOR gate 45.

Figure 7:
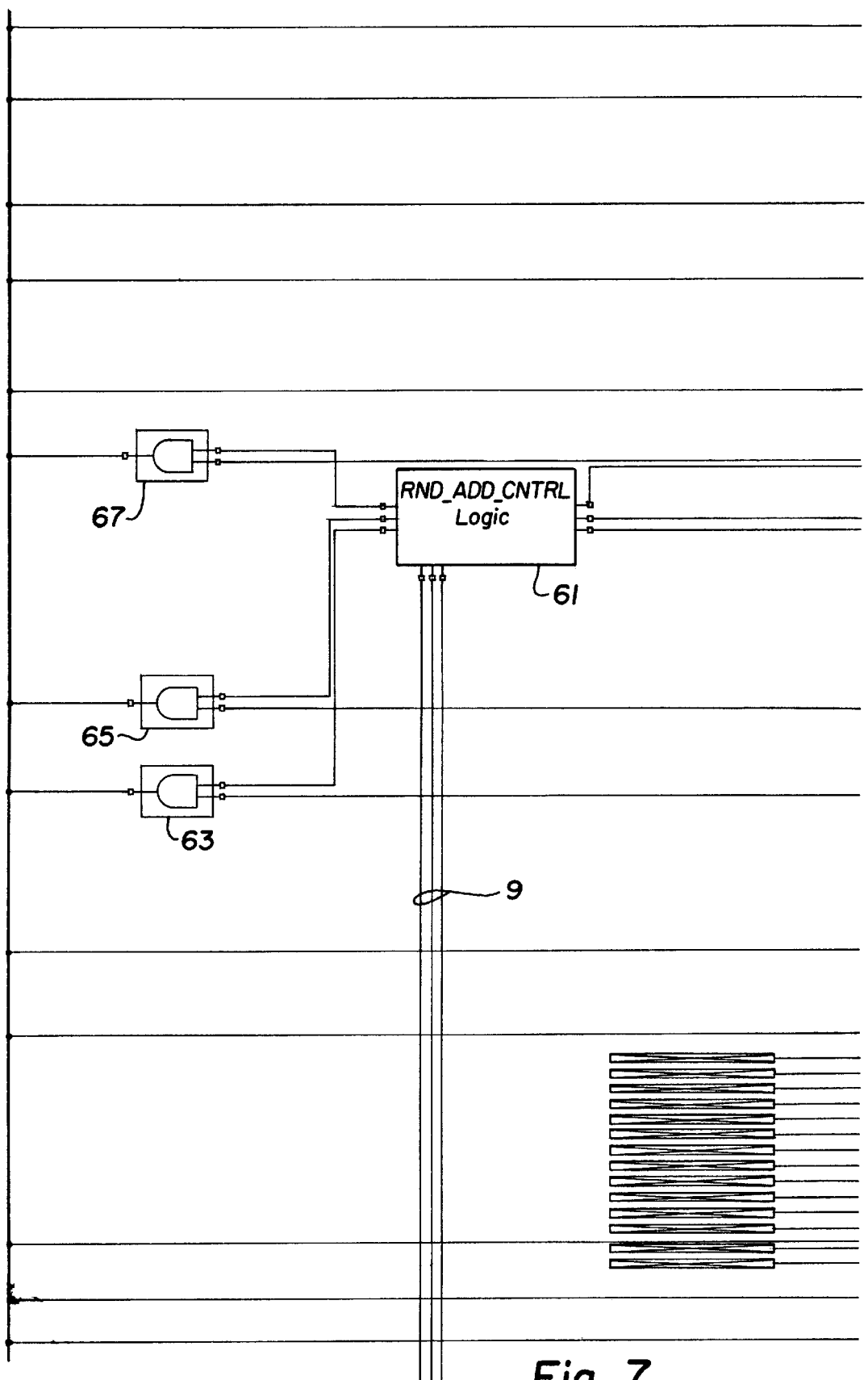
FIG. 7 is a schematic diagram of a rounding decoder constructed according to the invention shown in FIG. 1.

Turning now to FIG. 7, there is shown a schematic of a rounding decoder including a control logic 61 and output gates 63, 65 and 67. The carry-in Ci is applied to either the Z22, Z23 or Z24 input depending upon whether the rounding boundary is at bit 22, 23, or 24. The rounding constant 9 is provided on any one of three lines known as the scaling line, the scaling zero line, and ground command line. These three lines will select which one of the zero detect lines related to Z22, Z23, and Z24 is to be used for the rounding operation. The circuits used to round and control logic equivalent is illustrated in FIG. 3 and can detect if there is a special condition when the least significant bits after and including the boundary bit are all zero. When this condition is met, the first MSB adjacent to the boundary will be rounded up or down as determined by the convergent rounding process.

The control circuits shown in FIGS. 8, 9 and 10 are used in the adder circuit shown in FIGS. 4 through 4d at the appropriate location for mux_a, mux_b and mux_c, respectively. Each circuit includes the appropriate number of multipliers MUX22i. This multiplier is of conventional construction and shown in FIG. 5A.

The invention having been described, what is claimed is:

1. An adder circuit, comprising:
    a summing circuit to provide a summed sliced bit number from a first sliced bit number and a second sliced bit number;
    a boundary circuit operably connected to said summing circuit to form a rounding boundary between selected groups of the summed sliced bit number; and
    a rounding circuit operably connected to said boundary circuit to detect a zero in each slice of the summed sliced bit number while the first and second sliced bit numbers are being added to one another,
    said rounding circuit including
        a logic circuit to detect the zero and provide a zero detect output and
        a control circuit to selectively round the summed sliced bit number up and down in response to the zero detect output.

2. The adder circuit of claim 1, further comprising:
    said boundary circuit including
        a scaling means for selecting a boundary bit that is disposed adjacent to the rounding boundary.

3. The adder circuit of claim 1, further comprising:
    said rounding circuit forming
        a logic array rounding a most significant bit number up in response to a logic one being detected and for rounding the most significant bit number down in response to a logic zero being detected.

4. The adder circuit of claim 1, further comprising:
    said summing circuit including
        a circuit to dispose the sliced bits of the first and second sliced bit numbers in a parallel arrangement from a least significant bit k to a most significant bit k+1, the control circuit included in said rounding circuit having
            means for detecting the zero detect output of the first sliced bit number A and the second sliced bit number B of an $A_{k+1}$ bit and a $B_{k+1}$ bit to the boundary bit slice k upon receipt of the zero detect output.

5. The adder circuit of claim 4, further comprising:
    said rounding circuit forming
        a logic array rounding the most significant bit number up in response to a logic one being detected and for rounding the most significant bit number down in response to a logic zero being detected.

6. A method of improving the speed of an adder, comprising the steps of:
    slicing first and second bit numbers into first and second sliced bit numbers;
    forming a rounding boundary between selected groups of the first and second sliced bit numbers;
    adding the first and second sliced bit numbers to form a summed sliced bit number;
    detecting a zero at each slice of the summed slice bit number;
    providing a zero detect output in response to each detected zero;
    selectively rounding each summed sliced bit number up and down in response to the zero detect output.

7. The method of claim 6, further comprises the step of:
    scaling the selected groups of the first and second sliced bit numbers by selecting a boundary bit that is disposed adjacent to the rounding boundary.

8. The method of claim 6, wherein the step of forming a rounding boundary between selected groups of the first and second sliced bit numbers further comprises the steps of:
    forming a logic array; and
    rounding a most significant bit number up in response to a logic one being detected and rounding the most significant bit number down in response to a logic zero being detected.

9. The method of claim 6, wherein the step of detecting a zero at each slice of the summed slice bit number further comprises the steps of:

disposing the sliced bits of the first and second sliced bit numbers in a parallel arrangement from a least significant bit k to a most significant bit k+1; and detecting the zero detect output of the first sliced bit number A and the second sliced bit number B of an $A_{k+1}$ bit and a $B_{k+1}$ bit to the boundary bit slice k upon receipt of the zero detect output.

10. The method of claim 9, wherein the step of forming a rounding boundary between selected groups of the first and second sliced bit numbers further comprises the steps of:

forming a logic array; and rounding the most significant bits up in response to a logic one being detected and for rounding the most significant bits down in response to a logic zero being detected.

11. A multiply and accumulator circuit, comprising:

first and second registers to store a first operand A and a second operand B;

a decoder operably connected to said first and second registers to create a partial product from each of the first and second operands A and B;

a partial product summation tree circuit operably connected to said decoder circuit to create a first bit number A and a second bit number B and to partially add bit numbers A and B to one another; and an adder circuit for adding bit numbers A and B to one another to produce a summed bit number C operably connected to said partial product summation tree, said adder circuit including a summing circuit to provide a summed sliced bit number from a first sliced bit number and a second sliced bit number, a boundary circuit operably connected to said summing circuit to form a rounding boundary between selected groups of the summed sliced bit number, and a rounding circuit operably connected to said boundary circuit to detect a zero in each slice of the summed sliced bit number while the first and second sliced bit numbers are being added to one another, the rounding circuit including a logic circuit to detect the zero and provide a zero detect output and a control circuit to selectively round the summed sliced bit number up and down in response to the zero detect output.

12. The multiply and accumulator circuit of claim 11, further comprising:

the boundary circuit including a scaling means for selecting a boundary bit that is disposed adjacent to the rounding boundary.

13. The multiply and accumulator circuit of claim 11, further comprising:

the rounding circuit forming a logic array rounding a most significant bit number up in response to a logic one being detected and for rounding the most significant bit number down in response to a logic zero being detected.

14. The multiply and accumulator circuit of claim 11, further comprising:

the summing circuit including a circuit to dispose the sliced bits of the first and second sliced bit numbers in a parallel arrangement from a least significant bit k to a most significant bit k+1, the control circuit included in the rounding circuit having means for detecting the zero detect output of the first sliced bit number A and the second sliced bit number B of an $A_{k+1}$ bit and a $B_{k+1}$ bit to the boundary bit slice k upon receipt of the zero detect output.

15. The multiply and accumulator circuit of claim 14, further comprising:

the rounding circuit forming a logic array rounding the most significant bit number up in response to a logic one being detected and for rounding the most significant bit number down in response to a logic zero being detected.

* * * * *